United States Patent
Berselli

(10) Patent No.: US 12,099,016 B2
(45) Date of Patent: Sep. 24, 2024

(54) ILLUMINATOR FOR A VIEWING UNIT OF AN OPTICAL INSPECTION MACHINE FOR THE QUALITY CONTROL OF PARTS

(71) Applicant: DOSS VISUAL SOLUTION S.R.L., Bergamo (IT)

(72) Inventor: Hemiliano Berselli, Bergamo (IT)

(73) Assignee: DOSS VISUAL SOLUTION S.R.L., Bergamo (IT)

( * ) Notice: Subject to any disclaimer, the term of this patent is extended or adjusted under 35 U.S.C. 154(b) by 201 days.

(21) Appl. No.: 17/602,235

(22) PCT Filed: Apr. 7, 2020

(86) PCT No.: PCT/IB2020/053294
§ 371 (c)(1),
(2) Date: Oct. 7, 2021

(87) PCT Pub. No.: WO2020/208508
PCT Pub. Date: Oct. 15, 2020

(65) Prior Publication Data
US 2022/0178839 A1     Jun. 9, 2022

(30) Foreign Application Priority Data
Apr. 10, 2019   (IT) .................... 102019000005534

(51) Int. Cl.
*G01N 21/88*     (2006.01)
*G02B 5/10*      (2006.01)
(Continued)

(52) U.S. Cl.
CPC ........... *G01N 21/8806* (2013.01); *G02B 5/10* (2013.01); *H04N 23/51* (2023.01); *H04N 23/56* (2023.01);
(Continued)

(58) Field of Classification Search
CPC ....... G01N 21/8806; G01N 2021/8812; G01N 2201/02; G01N 2201/062; G01N 21/952;
(Continued)

(56) References Cited

U.S. PATENT DOCUMENTS

| | | | | |
|---|---|---|---|---|
| 4,706,168 A | * | 11/1987 | Weisner | G01B 11/00 362/18 |
| 7,357,529 B2 | * | 4/2008 | Choate | G02B 21/084 362/240 |
| 2008/0137324 A1 | * | 6/2008 | Pastore | G06K 7/10742 362/16 |

FOREIGN PATENT DOCUMENTS

| | | |
|---|---|---|
| EP | 2280270 A1 | 2/2011 |
| JP | 2012013474 A | 1/2012 |
| WO | 2010099636 A1 | 9/2010 |

* cited by examiner

*Primary Examiner* — Christina A Riddle
(74) *Attorney, Agent, or Firm* — ArentFox Schiff LLP; Michael Fainberg

(57) ABSTRACT

An illuminator for a viewing unit of an optical inspection machine for the quality control of parts, in particular gaskets, comprises a diffusion chamber, a diffuse illumination source, a low-angle illumination source, a direct illumination source placed in the diffusion chamber, and an annular reflective element placed in the diffusion chamber. The annular reflective element is integral to the direct illumination source so that together they form a chamber closure assembly delimiting the upper end of the diffusion chamber. The chamber closure assembly can move axially by translational movement in the diffusion chamber both toward and away from the diffuse illumination source.

11 Claims, 6 Drawing Sheets

(51) Int. Cl.
*H04N 23/51* (2023.01)
*H04N 23/56* (2023.01)
*H04N 23/695* (2023.01)
*G01N 21/952* (2006.01)

(52) U.S. Cl.
CPC ... *H04N 23/695* (2023.01); *G01N 2021/8812* (2013.01); *G01N 21/952* (2013.01); *G01N 2201/02* (2013.01); *G01N 2201/062* (2013.01)

(58) Field of Classification Search
CPC ... G01N 2021/8816; G01N 2021/8835; G01N 2021/8841; G01N 21/95; G01N 21/956; G01N 21/9515; G01N 2201/022; G01N 2201/0227; G01N 2201/0626; G01N 2201/0225; G01N 2201/0231; G01N 2201/0245; G01N 2021/8809–8819; G01N 21/88; G01N 21/90; G01N 21/9009; G01N 21/9036; G01N 21/9072; G01N 21/909; G02B 5/10; G02B 6/0001; G02B 7/003; G02B 7/005; G02B 7/182; G02B 7/1827; G02B 7/20; H04N 23/51; H04N 23/56; H04N 23/695; H04N 23/74; H05K 7/2039; G01B 11/245; F21V 7/00; F21V 7/0008; F21V 7/0016; F21V 7/066; F21V 7/04; F21V 7/041; F21V 7/043; F21V 7/045; F21V 7/06; F21V 13/02; F21V 14/02; F21V 14/04; F21V 19/001; F21V 19/0015; F21V 19/006; F21V 21/02; F21V 21/03; F21V 21/04; F21V 21/34; F21V 21/36; F21V 29/50; F21V 29/502; F21V 29/503; F21V 29/70; F21V 29/74; F21V 29/745; F21V 29/76; F21V 29/767; F21V 33/00; B07C 5/342; B07C 5/3422; G06T 2207/30164; G06T 2207/10152; G06T 7/0004
USPC ...... 362/216–217.16, 227–249.15, 253, 257, 362/277, 285–286, 296.01–306, 362/296.05–296.8, 296.09, 296.1, 317, 362/319, 341–350, 362, 372, 374; 348/61, 86, 92; 356/237.1–237.6
See application file for complete search history.

ILLUMINATOR FOR A VIEWING UNIT OF AN OPTICAL INSPECTION MACHINE FOR THE QUALITY CONTROL OF PARTS

CROSS-REFERENCE TO RELATED APPLICATIONS

This application is a National Phase Application of PCT International Application No. PCT/IB2020/053294, having an International Filing Date of Apr. 7, 2020 which claims priority to Italian Application No. 102019000005534 filed Apr. 10, 2019, each of which is hereby incorporated by reference in its entirety.

FIELD OF THE INVENTION

The present invention refers to a viewing unit of an optical inspection machine for the quality control of parts, in particular gaskets.

BACKGROUND OF THE INVENTION

There are already known illuminators for optical inspection machines provided with a plurality of illumination sources arranged so as to illuminate the part to be inspected from various angles and/or under various illumination conditions, for example to highlight specific portions of the part's surface which need to be taken by a video camera to obtain images on which to conduct dimension checks.

For example, there is a known illuminator forming a diffusion chamber and comprising a first illumination source suitable for generating a light beam inside the diffusion chamber directed toward a reflective element, a second illumination source suitable for illuminating side surfaces of a part to be inspected placed beneath the illuminator, and a third illumination source placed in the diffusion chamber suitable for generating a downward-pointing light beam so as to primarily illuminate the upper surface of the part.

One limitation of such illuminators is that they are designed to illuminate specific parts having very similar shapes, but they become less effective when used to illuminate parts having shapes and/or dimensions that are very different from those for which the illuminator was designed.

SUMMARY OF THE INVENTION

The purpose of this invention is to propose an illuminator capable of overcoming such a drawback and which can therefore also be used effectively to illuminate parts of differing shapes and/or dimensions.

This purpose is achieved with the illuminator according to claim 1. The dependent claims describe preferred embodiments of the invention.

BRIEF DESCRIPTION OF THE DRAWINGS

The features and advantages of the illuminator according to the invention will become clear from the description given below of preferred embodiments, given solely as non-limiting examples in reference to the enclosed figures, wherein.

DETAILED DESCRIPTION

Figure 1:
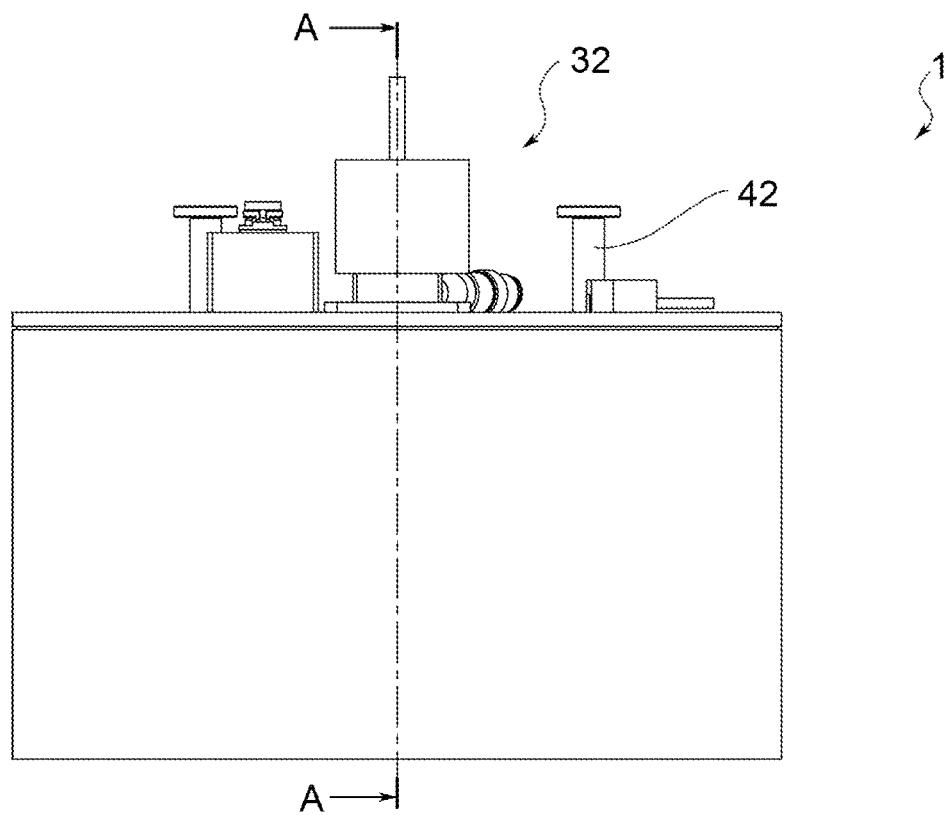
FIG. 1 is an elevation view of the illuminator according to the invention.
Figure 6:
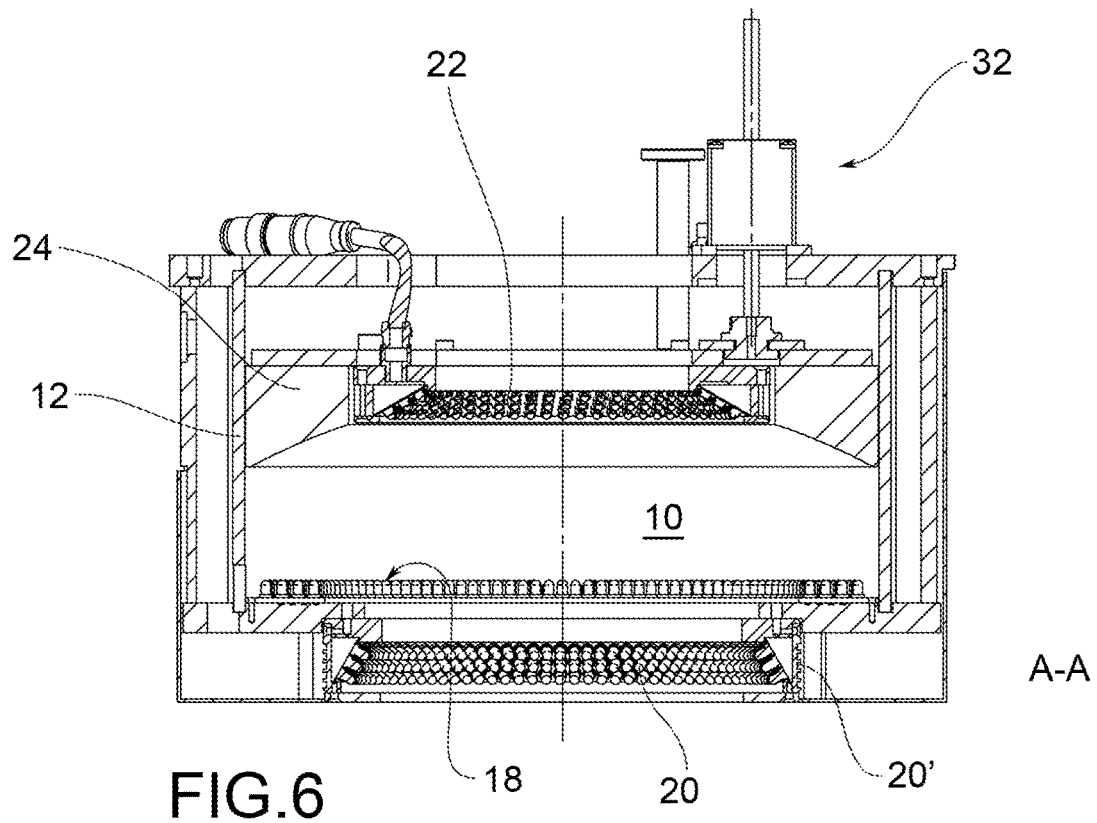
FIG. 6 is a cross-section similar to the previous one, in a second usage configuration.
Figure 2:
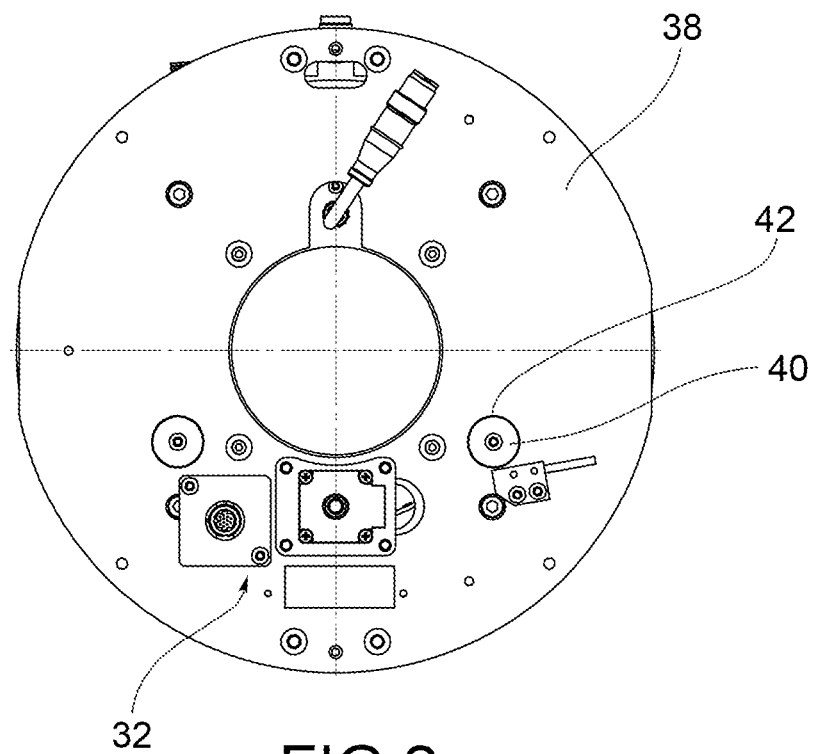
FIG. 2 is a plan view from above the illuminator.
Figure 4:
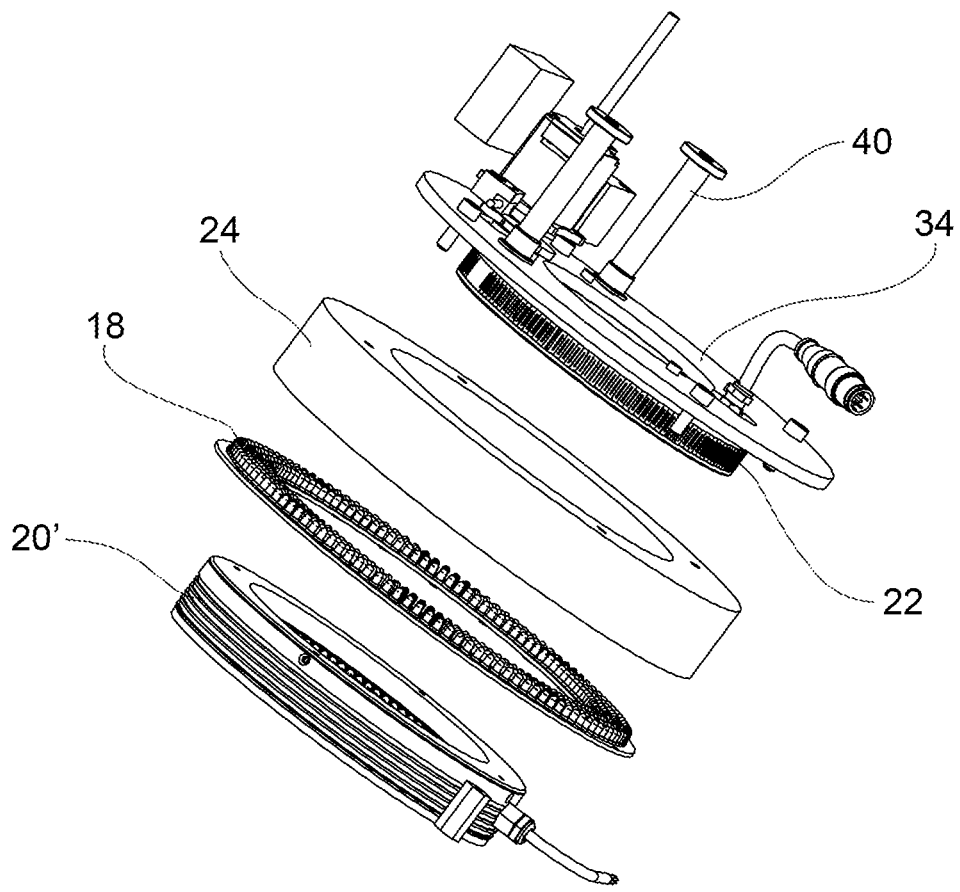
FIG. 4 is another exploded perspective view of the illuminator.
Figure 3:
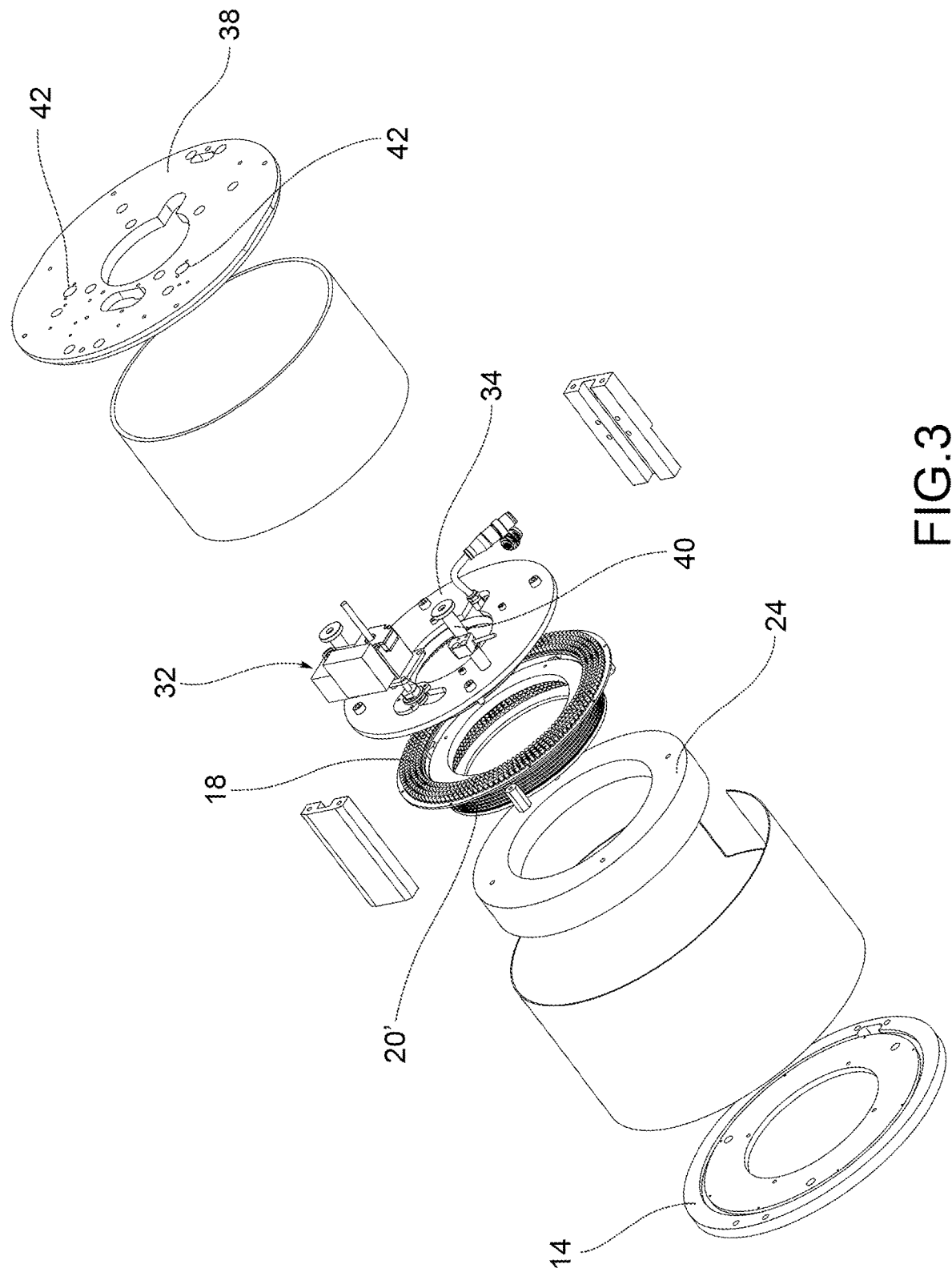
FIG. 3 is an exploded perspective view of the illuminator.
Figure 5:
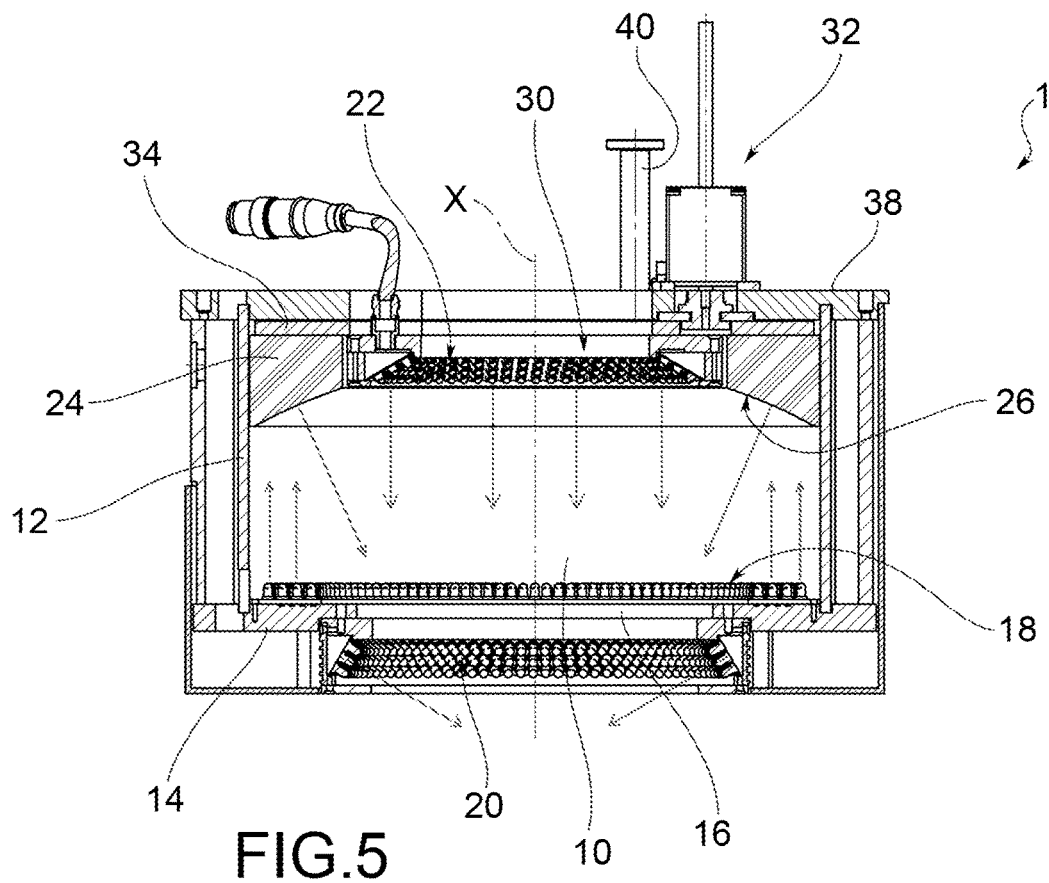
FIG. 5 is an axial cross-section, along line A-A of FIG. 1, of the illuminator in a first usage configuration.
Figure 7:
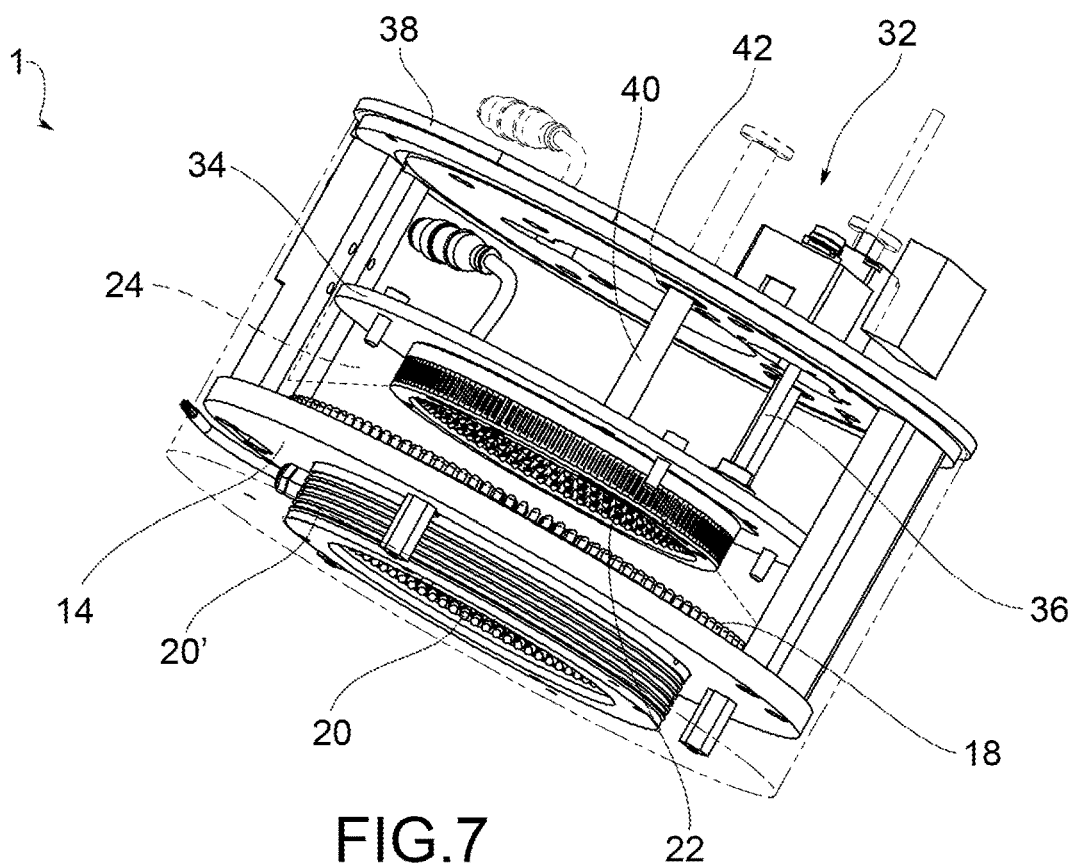
FIG. 7 is a perspective view of the illuminator, with some parts transparent.

In these drawings, the number 1 refers to an overall illuminator according to the invention for a viewing unit of an optical inspection machine 3 for the quality control of parts, in particular gaskets.

Illuminator 1 forms a substantially cylindrical diffusion chamber 10.

Diffusion chamber 10 is delimited laterally by a side wall 12 and on the bottom by a lower plate 14.

Lower plate 14 has a central opening 16 that allows a video camera 102 to frame a part to be inspected placed beneath and coaxially to illuminator 1.

Illuminator 1 comprises a diffuse illumination source 18 in the shape of a circular crown, supported by lower plate 14 and suitable for generating a light beam inside diffusion chamber 10 directed substantially in parallel to side wall 12.

Illuminator 1 comprises a low-angle illumination source 20 that extends beneath lower plate 14, around central opening 16, which is suitable for generating a light beam pointing downward and converging toward the main axis (X) of diffusion chamber 10 so as to illuminate side surfaces of a part to be inspected placed beneath the illuminator.

The illuminator is provided with a direct illumination source 22 placed in diffusion chamber 10 and suitable for generating a downward-directed light beam.

Illuminator 1 further comprises an annular reflective element 24 placed in diffusion chamber 10 and defining an annular portion of concave surface 26 facing diffuse light source 18 so as to reflect and diffuse the rays coming from diffuse illumination source 18 into diffusion chamber 10. In this way, a diffuse light is generated in diffusion chamber 10, creating optimum conditions for acquiring images of the part.

According to a feature of the invention, annular reflective element 24 is integral to direct illumination source 22 so that together they form a chamber closure assembly 30 delimiting the upper end of diffusion chamber 10. This chamber closure assembly 30 can move axially by translational movement in diffusion chamber 10 both toward and away from diffuse illumination source 18.

Thanks to the possibility of both direct light source 22 and annular reflective element 24 moving linearly, optimum illumination conditions can be achieved even for parts of differing shapes and/or dimensions.

For example, depending on the height of the part on a reference plane beneath the illuminator, the distance of the low-angle light source and the diffuse light source from the part to be inspected can be kept fixed by instead varying the distance of the chamber closure assembly from the part, or the distance of the chamber closure assembly from the part can be kept constant and the distance of the low-angle and diffuse light sources can be varied by raising or lowering the illuminator, or by changing the distance of all the illumination sources.

In one embodiment, chamber closure assembly 30 is operationally connected to a motor apparatus 32 for the axial translation thereof.

In one embodiment, the annular portion of concave surface 26 is a portion of a parabolic surface.

In one embodiment, direct illumination source 22 has substantially the shape of a truncated cone and extends radially, as it tapers in the upward direction, from the inside edge of the annular portion of concave surface 26 of annular reflective element 24.

In one embodiment, direct illumination source 22 and annular reflective element 24 are secured to the lower side of a movable plate 34 integral to a rod 36 of a motor apparatus 32 that is actuatable to cause chamber closure assembly 30 to move translationally.

In one embodiment, side wall 12 extends downward from an upper plate 38. Motor apparatus 32 is placed on this upper plate 38.

For example, chamber closure assembly 30 is integral to vertical guide columns 40 which slide, guided in corresponding openings 42 made in upper plate 38.

In one embodiment, low-angle light source 20 has substantially the shape of a truncated cone that widens as it extends downward from the edge delimiting central opening 16.

The light sources are preferably LED light sources.

In one embodiment, low-angle illumination source 20 is housed in a finned heat sink 20' suitable to dissipate heat.

Figure 8:
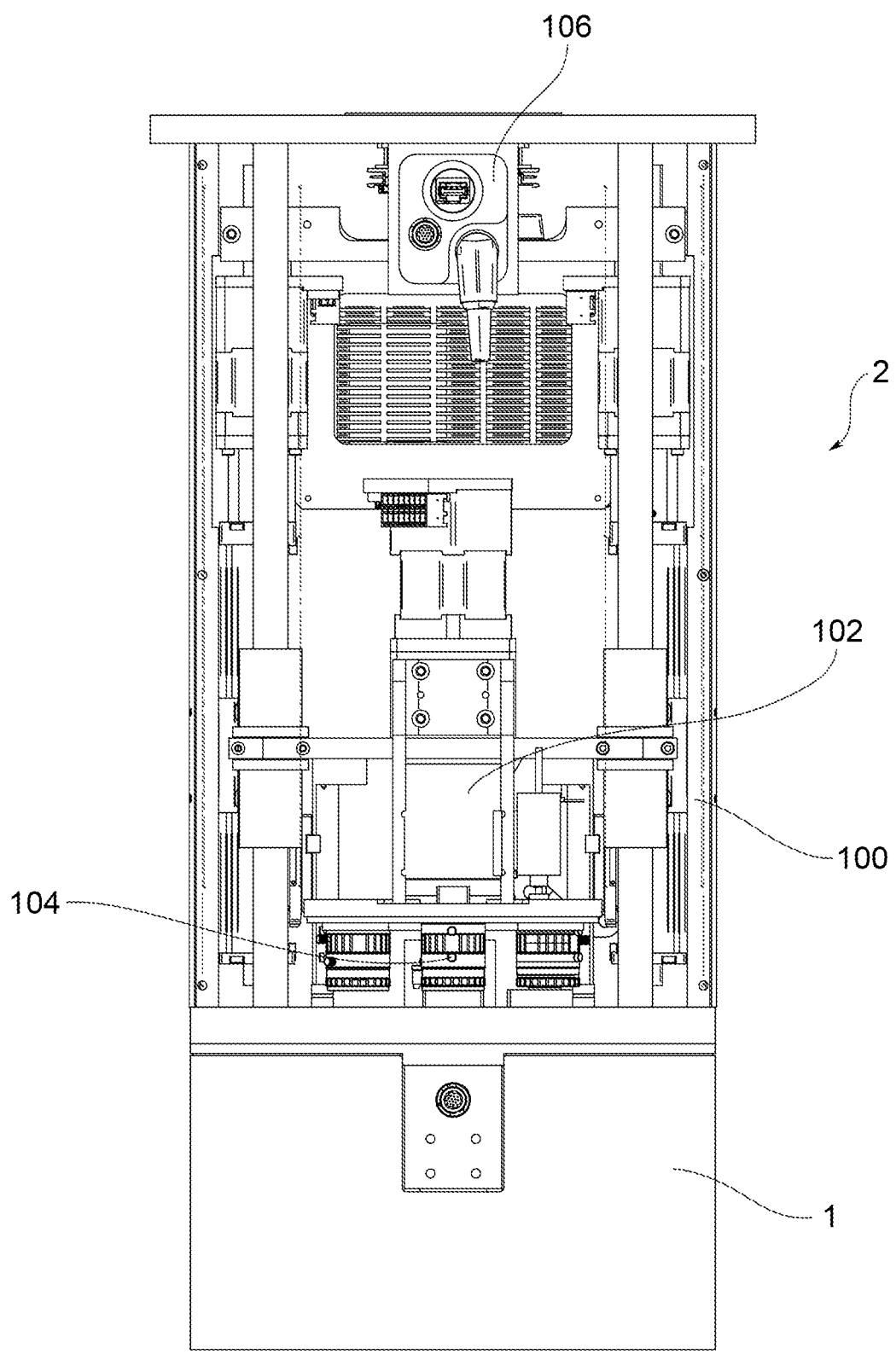
FIG. 8 is an elevation view of an example of a viewing unit that uses the illuminator of the invention.
Figure 9:
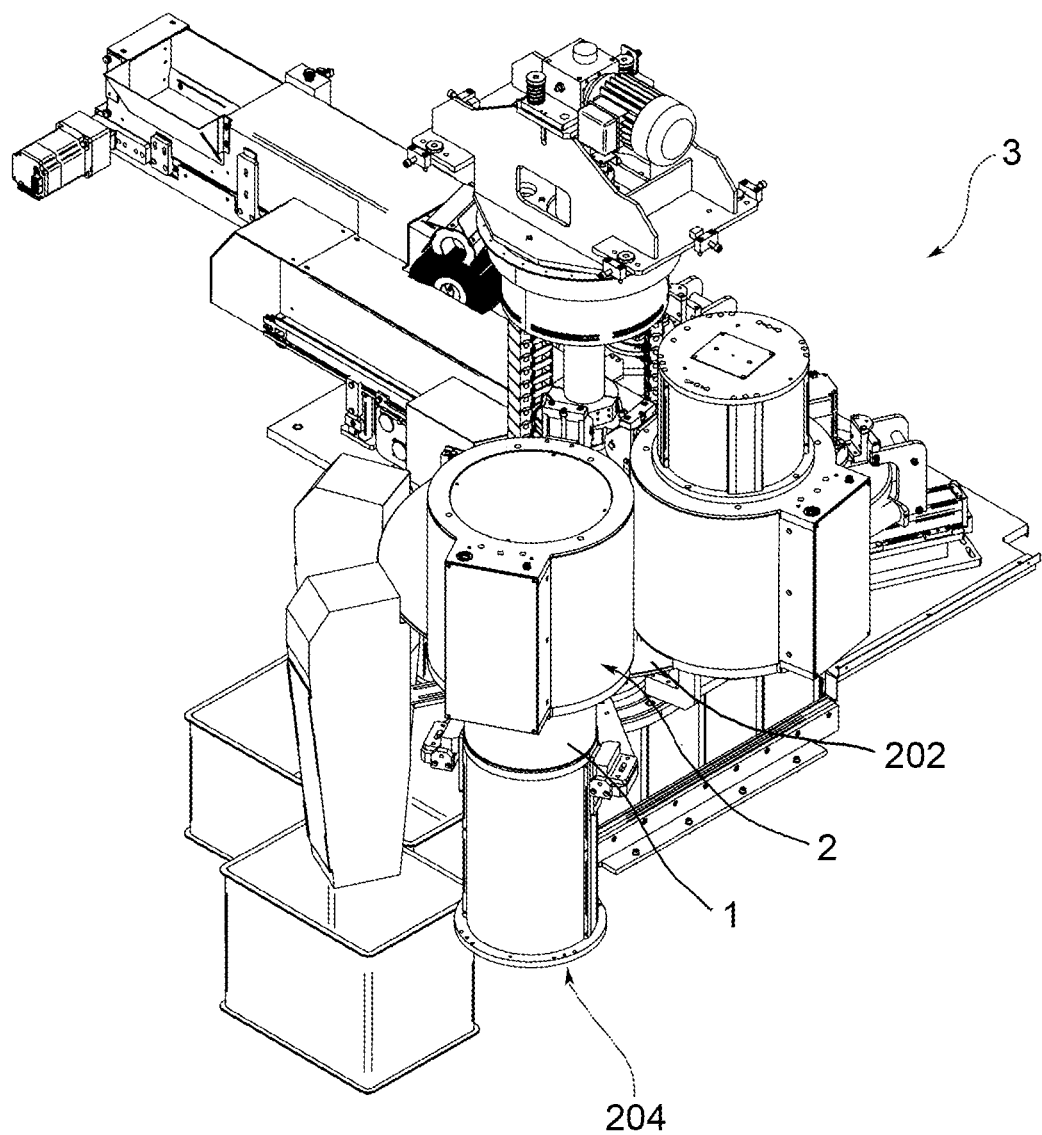
FIG. 9 is a perspective view of an example of an optical inspection machine for the quality control of parts that uses the viewing unit of FIG. 8.

The illuminator described above can be used advantageously in a viewing unit 2 for an optical inspection machine 3 for the quality control of parts, in particular gaskets, as illustrated in FIGS. 8 and 9.

Viewing unit 2 comprises a substantially cylindrical frame 100 with a vertical axis that slidably supports at least one video camera 102 provided with at least one downward-pointing optical unit 104. A focusing motor unit 106 is suitable for moving the video camera in the vertical direction. Illuminator 1 is secured to the base of frame 100.

FIG. 9 shows an example of an optical inspection machine 3 for the quality control of parts, in particular gaskets. Machine 3 comprises a rotary table 202 on which are positioned parts to be inspected, at least one inspection station 204 comprising, above and/or below the rotary table, a viewing unit 2 provided with illuminator 1 described above for inspecting one or more outer and/or inner surfaces of the parts placed on rotary table 202.

Machine 100 is provided with a processing unit, not shown, operationally connected to digital video camera 102, suitable for acquiring the images of the part taken by the video camera under the various lighting conditions determined by an illumination program controlling the illumination sources of illuminator 1.

In order to satisfy contingent requirements, a person skilled in the art could make modifications, adaptations, and substitutions of parts with functionally equivalent ones to the embodiments of the illuminator according to the invention, without exceeding the scope of the following claims. Each feature described as belonging to a possible embodiment may be implemented independently of the other described embodiments.

The invention claimed is:

1. An illuminator for a viewing unit of an optical inspection machine for the quality control of parts, comprising:
    a substantially cylindrical diffusion chamber delimited laterally by a side wall and on a bottom by a lower plate in which a central opening is made,
    a diffuse illumination source in the shape of a circular crown, supported by the lower plate and designed to generate a light beam inside the diffusion chamber directed substantially in parallel to the side wall,
    a low-angle illumination source that extends beneath the lower plate, around the central opening, which is designed to generate a light beam pointing downward and converging toward the main axis of the diffusion chamber so as to illuminate side surfaces of a part to be inspected placed beneath the illuminator;
    a direct illumination source inside the diffusion chamber capable of generating a downward-directed light beam;
    an annular reflective element placed in the diffusion chamber and defining an annular portion of a concave surface facing the diffuse illumination source so as to reflect and diffuse the rays coming from the diffuse illumination source into the diffusion chamber,
    wherein said annular reflective element is integral to the direct illumination source so that they together form a chamber closure assembly that delimits the top of the diffusion chamber, and wherein said chamber closure assembly can move axially with translational movement in the diffusion chamber both toward and away from the diffuse illumination source.

2. An illuminator according to claim 1, wherein said chamber closure assembly is operationally connected to a motor apparatus for the axial translation thereof.

3. An illuminator according to claim 1, wherein the annular portion with the concave surface is a portion of a parabolic surface.

4. An illuminator according to claim 1, wherein the direct illumination source has substantially the shape of a truncated cone and extends radially, as it tapers in the upward direction, from the inside edge of the annular portion of the concave surface of the annular reflective element.

5. An illuminator according to claim 1, wherein the direct illumination source and the annular reflective element are secured to the lower side of a movable plate integral to a rod of a motor apparatus that can be actuated to cause the chamber closure assembly to move translationally.

6. An illuminator according to claim 1, wherein the side wall extends below from an upper plate that supports a motor apparatus that can be actuated to cause the translation of the chamber closure assembly.

7. An illuminator according to claim 6, wherein the chamber closure assembly is integral to vertical guide columns that slide and are guided in corresponding openings made in the upper plate.

8. An illuminator according to claim 1, wherein the low-angle light source has substantially the shape of a truncated cone that widens as it extends downward from the edge delimiting the central opening.

9. An illuminator according to claim 8, wherein the low-angle illumination source is housed in a finned heat sink for dissipating heat.

10. An illuminator according to claim 1, wherein the illumination sources are LED illumination sources.

11. A viewing unit for an optical inspection machine for the quality control of parts, comprising a substantially cylindrical frame with a vertical axis that slidably supports at least one video camera provided with at least one downward-pointing optical unit, at least one focusing motor unit for moving the video camera in the vertical direction, and, at the base of the frame, an illuminator according to claim 1.

* * * * *